United States Patent [19]
Coldren et al.

[11] Patent Number: 5,961,052
[45] Date of Patent: Oct. 5, 1999

[54] CONTROL VALVE HAVING A TOP MOUNTED SINGLE POLE SOLENOID FOR A FUEL INJECTOR

[75] Inventors: Dana R. Coldren, Fairbury; Charles D. Ellenbecker, Normal, both of Ill.; Ching W. Jaw, Phoenix, Ariz.

[73] Assignee: Caterpillar Inc., Peoria, Ill.

[21] Appl. No.: 08/937,863

[22] Filed: Sep. 25, 1997

[51] Int. Cl.⁶ .............................. B05B 1/30; F02M 47/02
[52] U.S. Cl. .......................... 239/585.1; 239/88; 239/90; 239/91; 239/124; 239/585.3; 251/129.02; 251/129.07; 251/129.15
[58] Field of Search .................. 239/88, 90, 91, 239/124, 585.1, 585.2, 585.3; 251/129.02, 129.07, 129.15, 129.16

[56] References Cited

U.S. PATENT DOCUMENTS

| | | | |
|---|---|---|---|
| 3,379,214 | 4/1968 | Weinberg | 137/625.5 |
| 3,970,282 | 7/1976 | Hansen | 251/129.07 |
| 4,083,346 | 4/1978 | Eheim . | |
| 4,646,976 | 3/1987 | Rembold et al. | 251/129.16 X |
| 4,653,455 | 3/1987 | Eblen . | |
| 4,717,118 | 1/1988 | Potter | 251/129.02 |
| 4,869,462 | 9/1989 | Logie et al. | 251/129.16 |
| 4,957,275 | 9/1990 | Homes | 251/129.02 |
| 5,094,215 | 3/1992 | Gustafson | 239/89 X |
| 5,094,397 | 3/1992 | Peters et al. | 239/88 |
| 5,263,647 | 11/1993 | Cerny et al. | 239/585.1 |
| 5,373,828 | 12/1994 | Askew et al. | 123/506 |
| 5,385,301 | 1/1995 | Ueda | 239/88 |
| 5,407,131 | 4/1995 | Maley et al. | 239/90 |
| 5,474,234 | 12/1995 | Maley | 239/88 |
| 5,492,098 | 2/1996 | Hafner et al. | 123/446 |
| 5,494,219 | 2/1996 | Maley et al. | 239/88 |
| 5,651,501 | 7/1997 | Maley et al. | 239/88 |
| 5,779,219 | 7/1998 | Milda et al. | 251/129.07 |

*Primary Examiner*—Gregory L. Huson
*Assistant Examiner*—Robin O. Evans
*Attorney, Agent, or Firm*—Michael McNeil

[57] ABSTRACT

A control valve, preferably for use in a fuel injector, includes a valve body defining an inlet passage separated from an outlet passage by a valve seat. A single pole solenoid is attached to the valve body, and includes a pole piece and an armature. A valve member with a centerline is positioned in the valve body, attached to the armature and moveable between an open position in which the inlet passage is open to the outlet passage, and a closed position in which the inlet passage is closed to the outlet passage. The pole piece is positioned between the valve seat and the armature along the centerline of the valve member.

19 Claims, 3 Drawing Sheets

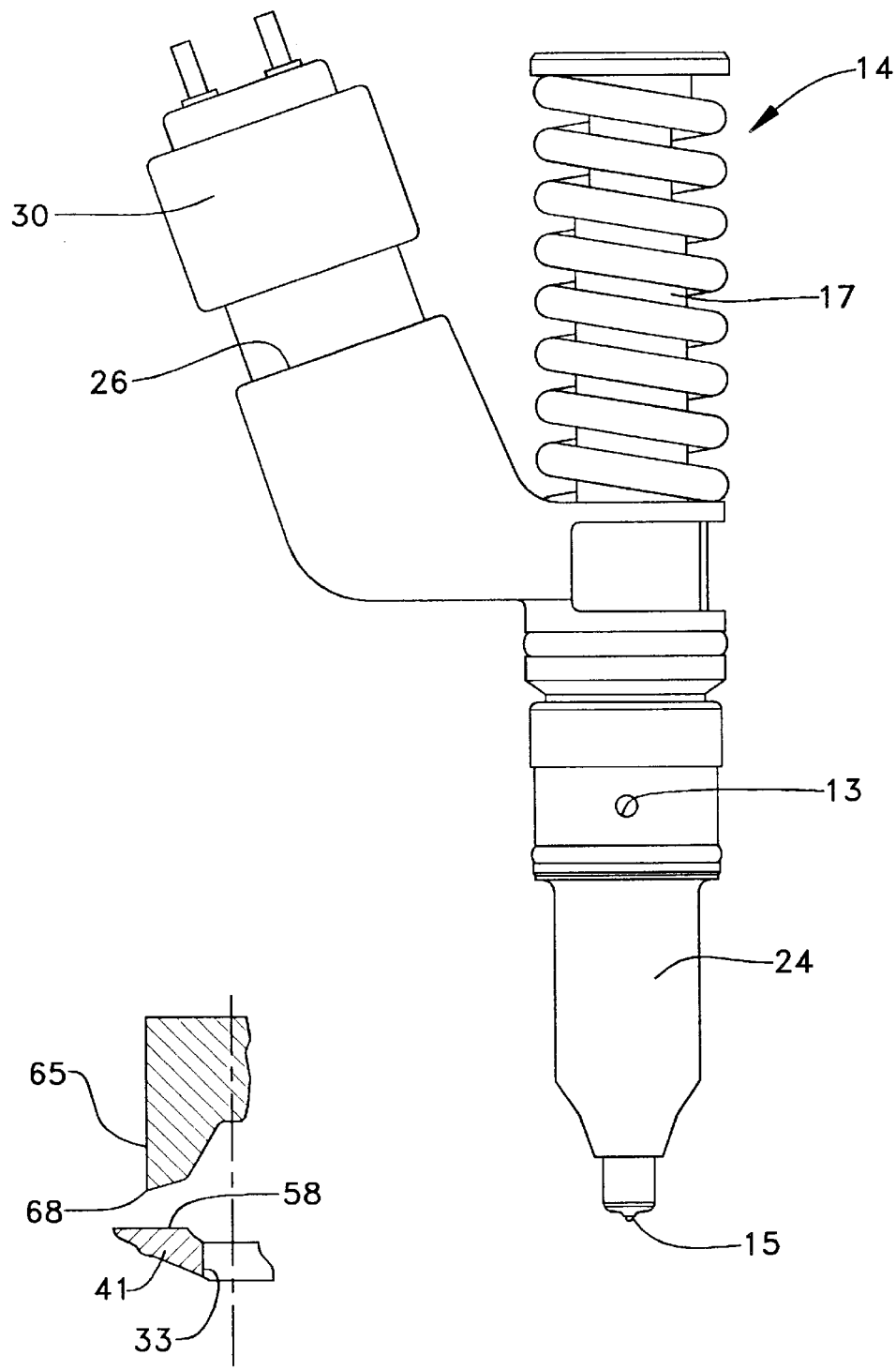

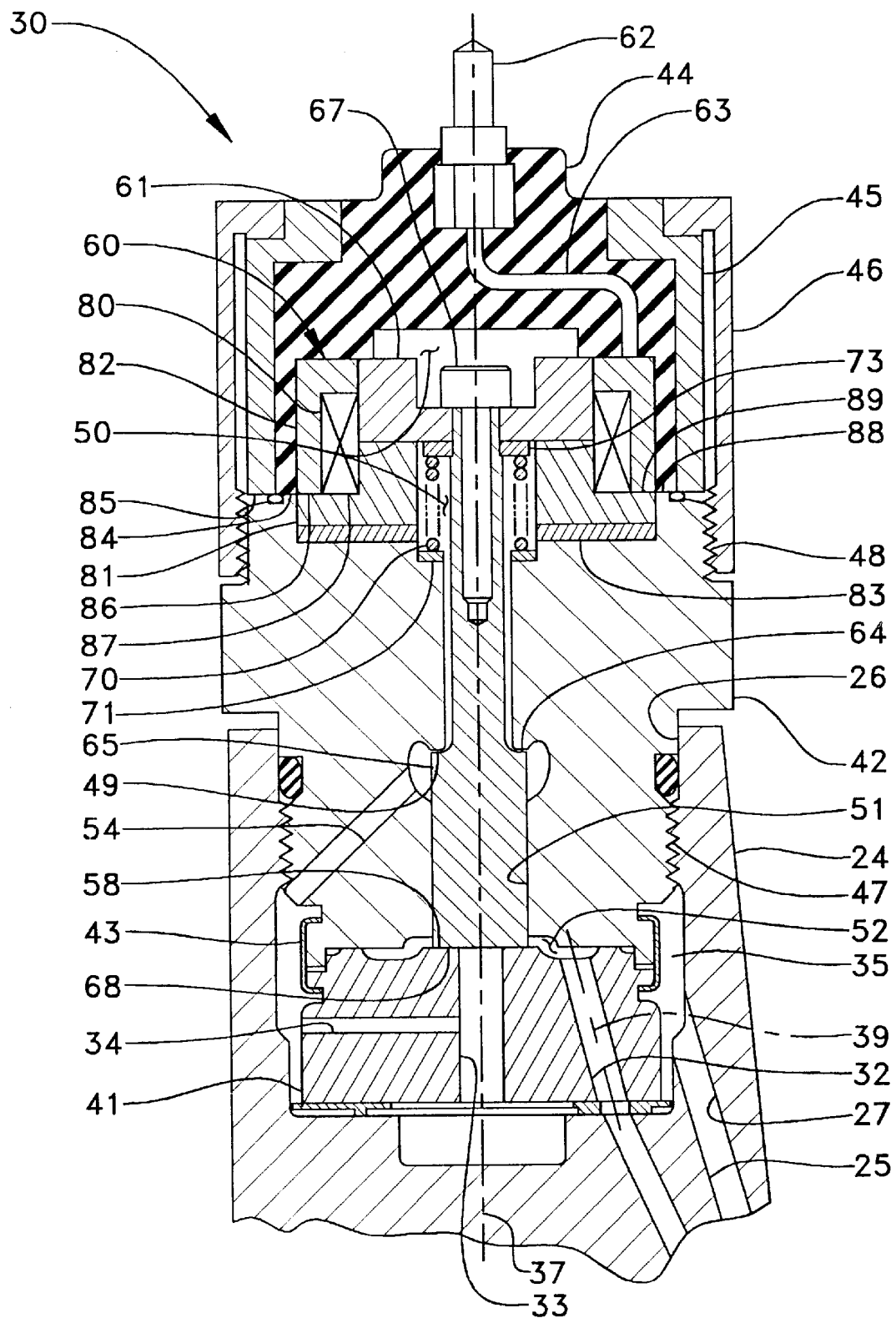
Fig_3_

CONTROL VALVE HAVING A TOP MOUNTED SINGLE POLE SOLENOID FOR A FUEL INJECTOR

TECHNICAL FIELD

The present invention relates generally to control valves for fuel injectors, and more particularly to control valves having a single pole solenoid.

BACKGROUND ART

Examples of electronically controlled cartridge control valves for fuel injectors are shown in U.S. Pat. No. 5,494,219 to Maley et al., U.S. Pat. No. 5,407,131 to Maley et al., U.S. Pat. No. 4,869,462 to Logie et al., and U.S. Pat. No. 4,717,118 to Potter. In each of these examples, the injector includes a mechanically actuated fuel pumping plunger and an electronically actuated fuel pressure control valve assembly. The pressure control valve assembly includes a solenoid operated poppet valve that controls fuel pressure in the injector in order to control fuel injection delivery. Fuel pressure is controllably enabled to be developed within the injector by electrical actuation of the pressure control valve assembly. Fuel pressure is controllably prevented from developing within the injector by not electrically actuating the pressure control valve so that fuel can spill through a return passage while the plunger is undergoing a portion of its pumping stroke.

In such electronically controlled fuel injectors, the armature of the pressure control valve assembly moves the poppet valve in one direction until it engages a valve seat, and holds the poppet valve in its closed position to enable fuel pressure to be developed in the injector, eventually resulting in fuel injection. At the end of the fuel injection cycle, the solenoid is de-energized, and a return spring moves the poppet valve member off the valve seat, returning the poppet valve member to its open position, which prevents the development of fuel pressure by spilling the fuel back to a fuel reservoir.

In these prior art control valves, the solenoid is of a dual pole design, which results in a relatively large armature that is pulled toward the solenoid coil when the same is energized. Depending upon the location of the valve seat within the control valve, space constraints can often limit the size of the coil and hence the amount of force that the solenoid can produce. This in turn limits the actuating speed of the valve and complicates the construction of the same, both by the difficulty of incorporating the solenoid within the valve body and by the increased number of components necessary to do the same. Reducing the total number of components in a valve can also often times decrease sensitivity to critical tolerances, that might otherwise be stacked in prior art designs. In addition to these problems, engineers are motivated to avoid problems associated with intersecting high pressure bores, which sometimes result in valve body cracking and/or leaking high pressure plugs.

The present invention is directed to overcoming one or more of the problems set forth above.

DISCLOSURE OF THE INVENTION

In one embodiment, a control valve includes a valve body that defines an inlet passage separated from an outlet passage by a valve seat. A solenoid is attached to the valve body, and includes a pole piece and an armature. A valve member with a centerline is positioned in the valve body and attached to the armature. The pole piece is positioned between the valve seat and the armature along the centerline. The valve member is moveable between an open position in which the inlet passage is open to the outlet passage, and a closed position in which the inlet passage is closed to the outlet passage.

In another embodiment, a control valve includes a valve body that defines an inlet passage separated from an outlet passage by a flat valve seat. A solenoid is attached to the valve body, and includes a pole piece, a coil with an inside diameter and an armature with an outside diameter that is less than the inside diameter of the coil. A valve member with a centerline and an annular knife edge is positioned in the valve body and attached to the armature. The pole piece is positioned between the valve seat and the armature along the centerline. The valve member is moveable between an open position in which the inlet passage is open to the outlet passage, and a closed position in which the inlet passage is closed to the outlet passage. The solenoid is positioned within an inner cavity that is at least partially defined by the valve body. The valve body defines a flow passage extending between the outlet passage and the inner cavity. The valve member moves away from the coil when moving from its open position to its closed position.

In still another embodiment, a fuel injector includes an injector body that defines a nozzle outlet and a cartridge opening, and further defines a spill passage and a return passage that open into the cartridge opening. A control valve with a valve body is received in the cartridge opening and attached to the injector body. The valve body defines an inlet passage separated from an outlet passage by a valve seat. The inlet passage opens to the spill passage, and the outlet passage opens to the return passage. A solenoid is attached to the valve body, and includes an armature. A valve member is positioned in the valve body, attached to the armature, and is moveable between an open position in which the inlet passage is open to the outlet passage, and a closed position in which the inlet passage is closed to the outlet passage. The valve member moves away from the coil when moving from its open position to its closed position.

BRIEF DESCRIPTION OF THE DRAWINGS

FIG. 2 is an elevational view of a fuel injector incorporating a cartridge control valve according to one embodiment of the present invention.

FIG. 3 is a sectioned side elevational view of a cartridge control valve according to the present invention.

FIG. 4 is a fragmented sectional view illustrating a flat valve seat and a valve member with an annular knife edge in accordance with one aspect of the present invention.

BEST MODE FOR CARRYING OUT THE INVENTION

Figure 1:
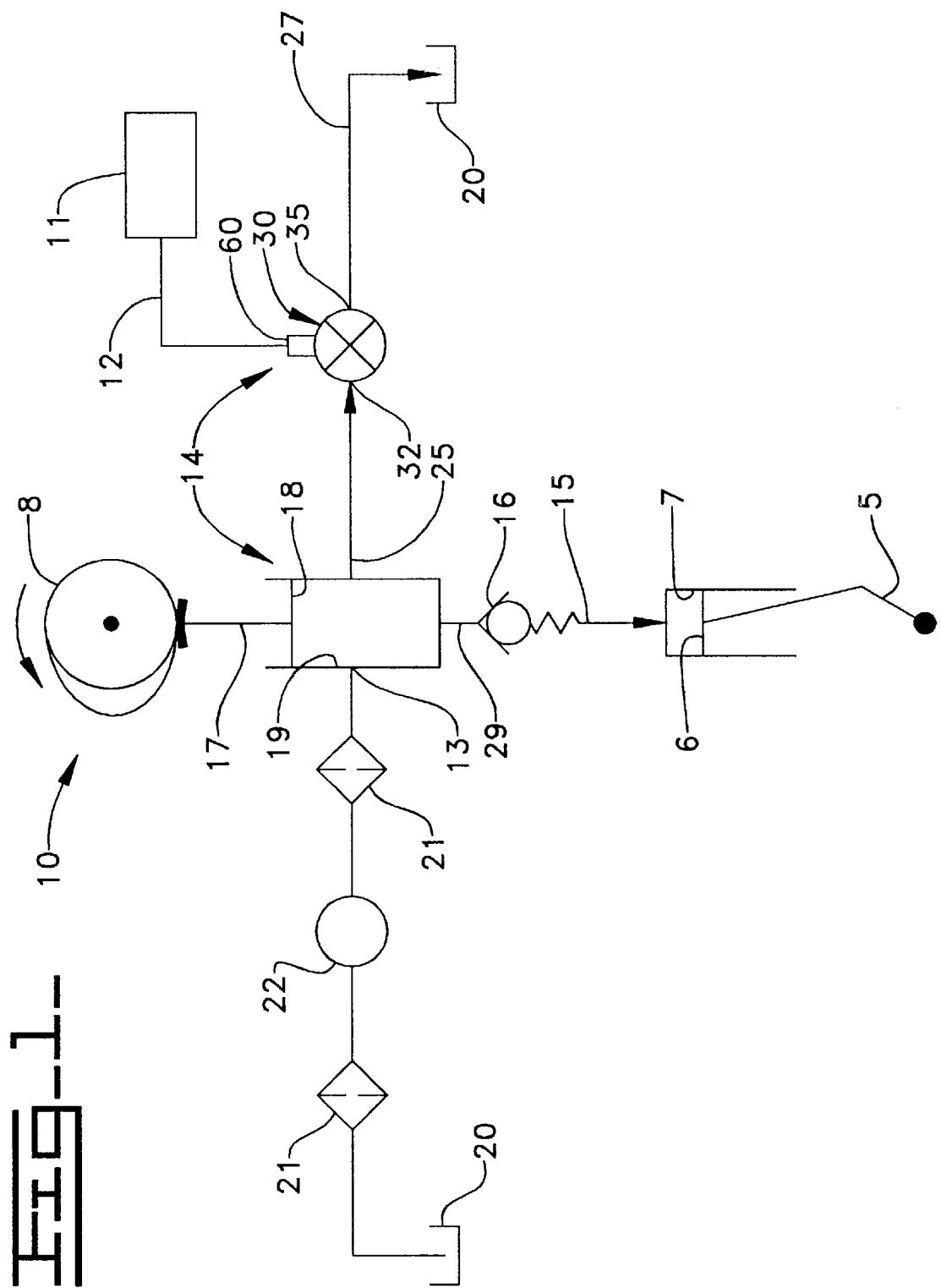
FIG. 1 is a schematic diagram illustrating a mechanically actuated electronically controlled fuel injection system.

In the drawings, the same reference numerals designate the same elements for features throughout all of the drawings.

Referring now to FIG. 1, there is illustrated an fuel injection system 10 adapted for a diesel-cycle direct-injection internal combustion engine having a number of engine pistons, only one of which is shown, i.e. piston 6. Each engine piston and corresponding engine cylinder would have a different fuel injector 14. Each engine piston 6 reciprocates in a separate cylinder 7 due to rotation of the engine drive shaft 5 in a conventional manner. Drive shaft 5 also rotates cam 8 which acts upon a tappet 17 of each injector 14 to mechanically actuate the injectors with each revolution of the engine.

Fuel injection system 10 includes a fuel source or tank 20. Fuel is drawn from fuel tank 20 by a relatively low pressure transfer pump 22, which carries the fuel through one or more fuel filters 21 to the fuel inlet 13 of each injector 14. With each revolution of cam 8, tappet 17 drives a pump piston 18 downward in pump chamber 19. Pump chamber 19 is connected to a spill passage 25 and a nozzle chamber 29 within injector 14. When fuel pressure within pumping chamber 19 is above a valve opening pressure, needle check valve 16 opens and fuel commences to spray into cylinder 7 through nozzle outlet 15. The fuel is prevented from reaching the valve opening pressure as long as spill passage 25 is open.

Spill passage 25 is connected to an inlet passage 32 of cartridge control valve 30. An outlet passage 35 from cartridge control valve 30 is connected to a return passage 27, which in turn is connected back to fuel tank 20 for recirculation. Fuel injection is controlled by opening and closing cartridge control valve 30 to open and close fluid communication between inlet passage 32 and outlet passage 35. This opening and closing of cartridge control valve 30 is controlled by a conventional electronic control module 11 that commands the energization or de-energization of a solenoid 60 via a communication line 12 in a conventional manner.

Referring now to FIG. 2, an example injector 14 according to the present invention is illustrated. Fuel injector 14 includes an injector body 24, a fuel inlet 13, a nozzle outlet 15 and a cartridge opening 26 formed in injector body 24. A cartridge control valve 30 is received in cartridge opening 26 and attached to injector body 24. A spill passage 25 and a return passage 27 are defined by injector body 24 and open into cartridge opening 26 (see FIG. 3).

Referring now to FIG. 3, the inner structure of cartridge control valve 30 is illustrated. Cartridge control valve 30 includes a valve body made up of a plurality of cylindrically shaped valve body components 41 and 42, and a metal housing 45, that are attached to one another in a manner well known in the art. In this embodiment, metal housing component 45 is attached to valve body component 42 with a threaded cap 46 that mates to external threads 48. Valve body component 42 includes additional outer threads 47 that mate to inner threads machined in cartridge opening 26 of injector body 24. Before being attached to injector body 24, valve body components 41 and 42 are held together with a retaining ring 43. When cartridge control valve 30 is attached to injector body 24, its inlet passage 32 is connected to a spill passage 25, which is connected to the pump chamber within the injector as discussed earlier. Also, an annular outlet passage 35 is connected to a return passage 27. When control valve 30 is attached to injector body 24, valve body components 41 and 42 are held together in a sealing arrangement to define a spill cavity 52, which opens to inlet passage 32.

A poppet valve member 65 is mounted within the valve body and reciprocates between an open position in which annular outlet passage 35 is open to inlet passage 32 via a vertical outlet passage 33 and a plurality of horizontal outlet passages 34, only one of which is shown. Poppet valve member 65 can also be moved to a closed position in which inlet passage 32 is closed to outlet passages 33–35.

The various body and housing components of cartridge control valve 30 are preferably attached to one another in a way that seals against leakage of fuel out of cartridge control valve 30. The valve body component 42 and metal housing 45 define an inner cavity 50 within which is mounted a portion of valve member 65 and a solenoid 60. Poppet valve member 65 is attached to an armature 61 of solenoid 60 via a conventional screw 67, which may be made from a non-magnetic material to magnetically isolate armature 61 from valve member 65. A flow passage 54 defined by valve body component 42 extends between inner cavity 50 and annular outlet passage 35 so that inner cavity 50 is wetted but is sealed against leakage to the outside of cartridge control valve 30 in a conventional manner. When valve member 65 is lifted to its open position, annular shoulder 64 abuts annular travel stop 49 to obstruct flow passage 54. This obstruction of flow passage 54 does not necessarily mean that all flow through flow passage 54 is blocked. Preferably, the obstruction is merely sufficient to prevent pressure waves from traveling through flow passage 54 into inner cavity 50 with sufficient magnitude to cause a secondary injection event, when the valve is being opened at the end of an injection event.

A return spring 70 normally biases poppet valve member 65 upward to its open position. The upward force of return spring 70 is trimmed during manufacture of cartridge control valve 30 through the use of a trimming spacer 71. An air gap shim 73 is pinched between an annular shoulder on valve member 65 and the underside of armature 61 by screw 67. Air gap shim 73 is chosen to have a thickness that insures some minimum air gap between the underside of armature 61 and lower pole piece 81, which is a portion of solenoid 60. Both spacer 71 and shim 73 may be made from non-magnetic material to further magnetically isolate armature 61 from valve body component 42 and valve member 65, if the same are made from a magnetizable material.

Referring now also to FIG. 4, valve body component 41 is machined to include a flat annular valve seat 58 that defines a portion of a spill cavity 52, which itself is defined by the joinder of valve body components 41 and 42. One end of poppet valve member 65 is machined to include an annular knife edge valve surface 68 that closes spill cavity 52 to vertical passage 33 when seated against flat valve seat 58. Thus, return spring 70 normally biases annular knife edge 68 away from flat valve seat 58 as shown in FIG. 4.

Solenoid 60 is preferably a single pole type solenoid that includes a lower pole piece 81 and an upper pole piece 82. During assembly, lower pole piece is received in a portion of inner cavity 51 defined by valve body component 42, and is positioned on top of a magnetic insulator 83. Magnetic insulator 83 is preferably made from a non-magnetic material in order to isolate valve body component 42 from lower pole piece 81. In addition, the thickness of magnetic insulator 83 is preferably chosen such that annular shoulder portion 89 of lower pole piece 81 is substantially flush with top contact surface of valve body component 42.

In order to simplify the assembly of control valve 30, upper pole piece 81, coil 80, terminal 62 and intervening electrical conductors 63 are molded into a plastic housing 44, which is preferably made from a non-electrically conducting and non-magnetic plastic material, such as nylon. The plastic housing 44 may be attached to outer metal housing 45 in any conventional manner, or may be molded into the same. In order to simplify assembly and improve uniformity, the bottom edge of plastic housing 44, the bottom edge of upper pole piece 82 and the coil bottom 87 of coil 80, are preferably made flush with the bottom contact surface 84 of metal housing 45. This structure insures that little or no crushing of upper pole piece 82, coil 80 and/or lower pole piece 81 takes place when metal housing 45 is mated to valve body component 42 as shown in FIG. 3. Plastic housing 44 and metal housing 45 ensure that the upper portion of the valve essentially behaves as an integral one piece component when control valve 30 is assembled during production.

When solenoid 60 is energized, armature 61 is pulled downward toward lower pole piece 81. When this occurs, poppet valve member 65 is pushed downward away from coil 80 to seat annular knife edge 68 against flat valve seat 58 to close fluid communication between inlet passage 32 and annular outlet passage 35. It should be noted that the outside diameter of armature 61 is slightly smaller than the inside diameter of upper pole piece 82 and coil 80 so that the same can move when solenoid 60 is energized. This structure results in upper pole piece 82 and coil 80 substantially surrounding armature 61.

Poppet valve member 65 is preferably hydraulically balanced by having a first hydraulic surface area exposed to fluid pressure in inner cavity 50 that is about equal to a second hydraulic surface area that is exposed to fluid pressure in vertical outlet passage 33. Thus, except for fluid pressure gradients existing between inner cavity 50 and vertical outlet passage 33, the only forces acting on poppet valve member 65 should originate from solenoid 60 and return spring 70.

Although the high fuel pressures existing in inlet passage 32 and spill cavity 52 during an injection event will inevitably cause a small amount of fuel to leak along the outer surface of poppet valve member 65 along guide bore 51, inner cavity 50 is substantially isolated from inlet passage 32 when poppet valve member 65 is in its closed position. Flow passage 54 prevents the build-up of fluid pressure within cavity 50. The use of a wetted inner cavity 50 permits the fuel within this area to damp the movement of poppet valve 65 so that it does not bounce back toward its closed position upon contacting its back stop at its open position. Flow passage 54 also serves to relieve any excess fluid pressure in inner cavity 50 so that poppet valve member 65 remains hydraulically balanced. The obstruction of flow passage 54 by valve member 65 when in its open position substantially prevents secondary injections by impeding the travel of pressure waves through flow passage 54 into inner cavity 50.

Industrial Applicability

The control valve of the present invention finds potential application in any valve in which a solenoid is used to open and close the valve. By utilizing a single pole solenoid, the present invention allows the solenoid coil to be moved to an outer portion of the valve body, instead of being embedded within the same. Control valve 30 of the present invention is designed to maximize solenoid size (force), minimize electrical connections, reduce the complexity of the valve and cost of the electrical circuitry, as well as eliminate high pressure intersecting holes and plugs for improved structural robustness and low cost. Since the poppet travel stop is integral with the poppet valve member and the valve body component, the travel of the same is set by machining the distance on the poppet between its knife edge surface and its annular shoulder. Since the poppet seat is flat, alignment of the high pressure valve body component 41 and the valve body component 42 are not critical and the two parts can be separate, therefore negating the need for high pressure intersecting holes. These structural features of the present invention desensitize the overall valve structure to tolerancing constraints associated with prior art control valves.

Although the present invention finds potential application in a wide variety of valving applications, it is particularly applicable for use as a control valve in fuel injectors. The present invention is particularly suited as a cartridge control valve for the mechanically actuated electronically controlled fuel injectors of the type manufactured by Caterpillar, Inc. of Peoria, Ill.

Those skilled in the art will appreciate that numerous modifications and alternative embodiments of the present invention will be apparent in view of the foregoing description. Accordingly, this description is to be construed as illustrative only and is for the purpose of teaching those skilled in the art the best mode of carrying out the invention. The details of the structure may be varied substantially without departing from the spirit of the invention, the scope of which is defined in terms of the claims as set forth below.

We claim:

1. A control valve comprising:
   a valve body defining an inlet passage separated from an outlet passage by a valve seat;
   a single pole solenoid attached to said valve body, and including a pole piece and an armature;
   a valve member with a centerline being positioned in said valve body and attached to said armature;
   said pole piece being positioned between said valve seat and said armature along said centerline;
   said valve member being moveable between an open position in which said inlet passage is open to said outlet passage, and a closed position in which said inlet passage is closed to said outlet passage;
   wherein said solenoid is positioned within an inner cavity; and
   said valve body defines a flow passage extending between said outlet passage and said inner cavity.

2. The control valve of claim 1 wherein said single pole solenoid includes a coil with an inside diameter; and
   said armature has an outside diameter that is less than said inside diameter.

3. The control valve of claim 1 wherein said pole piece is a lower pole piece; and
   said single pole solenoid further includes an upper pole piece and a coil that substantially surround said armature.

4. The control valve of claim 3 further comprising a terminal assembly;
   said terminal assembly, said upper pole piece and said coil being molded into a plastic housing; and
   said lower pole piece being received in a pole bore defined in said valve body.

5. The control valve of claim 4 wherein a bottom edge of said upper pole piece is about flush with a plane defined by a bottom edge of said plastic housing;
   a portion of said lower pole piece is about flush with a top contact surface of said valve body; and
   said bottom edge of said plastic housing abuts said top contact surface of said valve body.

6. The control valve of claim 1 wherein said valve member includes an annular knife edge;
   said valve seat is a flat valve seat; and
   said annular knife edge seats against said flat valve seat when said valve member is in said closed position.

7. The control valve of claim 1 wherein said valve member obstructs said flow passage when said valve member is in said open position.

8. The control valve of claim 7 wherein said valve body includes an annular travel stop that contacts said valve member when said valve member is in said open position; and a portion of said flow passage is defined by said annular travel stop.

9. The control valve of claim 1 wherein said single pole solenoid includes a coil; and said valve member moves away from said coil when moving from said open position to said closed position.

10. The control valve of claim 9 further comprising a compression spring positioned to bias said valve member toward said open position.

11. A control valve comprising:

a valve body defining an inlet passage separated from an outlet passage by a flat valve seat;

a single pole solenoid attached to said valve body, and including a pole piece, a coil with an inside diameter and an armature with an outside diameter that is less than said inside diameter;

a valve member with a centerline and an annular knife edge being positioned in said valve body and attached to said armature;

said pole piece being positioned between said valve seat and said armature along said centerline;

said valve member being moveable between an open position in which said inlet passage is open to said outlet passage, and a closed position in which said inlet passage is closed to said outlet passage;

said single pole solenoid being positioned within an inner cavity that is at least partially defined by said valve body;

said valve body defines a flow passage extending between said outlet passage and said inner cavity; and said valve member moves away from said coil when moving from said open position to said closed position.

12. The control valve of claim 11 wherein said pole piece is a lower pole piece; and said single pole solenoid further includes an upper pole piece that substantially surrounds said armature.

13. The control valve of claim 12 further comprising a terminal assembly;

said terminal assembly, said upper pole piece and said coil being molded into a plastic housing; and said lower pole piece being received in a pole bore defined in said valve body.

14. The control valve of claim 13 wherein a bottom edge of said upper pole piece is about flush with a plane defined by a bottom edge of said plastic housing;

a portion of said lower pole piece is about flush with a top contact surface of said valve body; and said bottom edge of said plastic housing abuts said top contact surface of said valve body.

15. The control valve of claim 12 wherein said valve member obstructs said flow passage when said valve member is in said open position;

said valve body includes an annular travel stop that contacts said valve member when said valve member is in said open position; and a portion of said flow passage is defined by said annular travel stop.

16. A fuel injector comprising:

an injector body defining a nozzle outlet and a cartridge opening, and further defining a spill passage and a return passage that open into said cartridge opening;

a cartridge control valve with a valve body and being received in said cartridge opening and attached to said injector body;

said valve body defining an inlet passage separated from an outlet passage by a valve seat, and said inlet passage opening to said spill passage, and said outlet passage opening to said return passage;

a single pole solenoid attached to said valve body, and including an armature;

a valve member being positioned in said valve body, attached to said armature, and being moveable between an open position in which said inlet passage is open to said outlet passage, and a closed position in which said inlet passage is closed to said outlet passage; and said valve member moves away from said coil when moving from said open position to said closed position.

17. The fuel injector of claim 16 wherein said single pole solenoid includes a pole piece;

said valve member has a centerline; and said pole piece is positioned between said valve seat and said armature along said centerline.

18. The fuel injector of claim 17 wherein said coil has an inside diameter; and said armature has an outside diameter that is less than said inside diameter.

19. The fuel injector of claim 18 wherein said valve member includes an annular knife edge;

said valve seat is a flat valve seat; and said annular knife edge seats against said flat valve seat when said valve member is in said closed position.

* * * * *